A. J. FRANKLAND.
SANITARY SPOON.
APPLICATION FILED AUG. 27, 1918.

1,312,111.  Patented Aug. 5, 1919.

Inventor
Alexander J. Frankland
By Strong & Townsend
Attorneys

UNITED STATES PATENT OFFICE.

ALEXANDER J. FRANKLAND, OF BERKELEY, CALIFORNIA.

SANITARY SPOON.

1,312,111.     Specification of Letters Patent.     Patented Aug. 5, 1919.

Application filed August 27, 1918. Serial No. 251,707.

*To all whom it may concern:*

Be it known that I, ALEXANDER J. FRANKLAND, a citizen of the United States, residing at Berkeley, in the county of Alameda and State of California, have invented new and useful Improvements in Sanitary Spoons, of which the following is a specification.

This invention relates to a sanitary spoon and method of making the same.

It has been found desirable to provide inexpensive utensils and implements, such as knives, forks, spoons and dishes which may be readily made and may be discarded after use. Various compositions have been utilized in carrying out this object, among them, papier-mâché and other plastic materials.

It is the principal object of this invention to provide a composition of matter which is formed of ingredients which may be readily obtained and may be easily combined and molded to form the desired article.

The present invention contemplates the use of a mineral composition adapted to be molded to form an article and thereafter to be treated with water-proofing material to render it sanitary and impervious to moisture.

The invention is illustrated by way of example in the accompanying drawings, in which—

Figure 1:
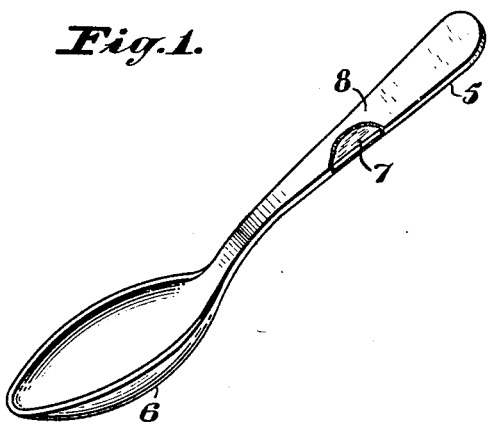
Figure 1 is a view in perspective illustrating a spoon showing part of its outer coating broken away to more clearly disclose its construction.
Figure 2:
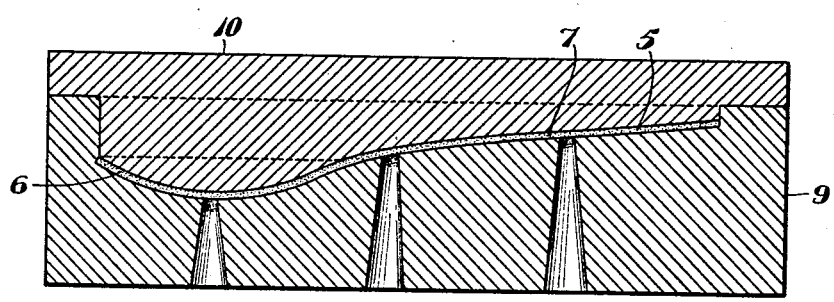
Fig. 2 is a view in section and elevation disclosing one manner in which the spoons may be made.

In the drawings, a spoon is shown having a handle 5 of any design desired and a suitable spoon 6. The main body portion of the spoon is formed of a mineral composition, as indicated at 7, and is thereafter coated with a coating 8 of paraffin or other material which would render the composition impervious to moisture.

The mineral composition is preferably composed of 50% white sand mixed with 40% diatomaceous earth, to which is added 10% of plaster of Paris and a small percentage of silicate of soda. It will be readily recognized that all of the ingredients used in this composition may be easily obtained, as white sand and diatomaceous earth exist in abundant quantities in most parts of the country. The sand, earth and plaster of Paris are mixed together to form a thoroughly homogeneous mass and the silicate of soda is added thereto to harden and bind the composition. Before the mass is entirely set it is placed within a die block 9 and thereafter compressed by a pressure block 10. These blocks, of course, have been properly shaped to form the article desired.

After the impression has been made by the die and the material has sufficiently hardened, the die may be removed and the article taken therefrom. When entirely hardened the article may be dipped into a solution of paraffin or other material which will coat its entire outer surface. It might be found convenient to add a water-proofing substance to the composition at the time of mixing. However, the method here disclosed appears to adequately cover the present requirement.

It will thus be seen that the composition of matter here disclosed consists of simple and inexpensive ingredients which may be readily mixed and may be easily handled to form the article desired.

While I have shown the preferred composition of ingredients and the proportion of their parts I wish it understood that various changes might be made therein without departing from the spirit of my invention as claimed.

Having thus described my invention, what I claim and desire to secure by Letters Patent is:

As a new article of manufacture, a sanitary tableware article adapted to be discarded after use formed of a base composed of 50% sand mixed with 40% diatomaceous earth, 10% plaster of Paris and silicate of soda molded into form coated with a waterproofing material.

In testimony whereof I have hereunto set my hand in the presence of two subscribing witnesses.

ALEXADER J. FRANKLAND.

Witnesses:
JOHN H. HERRING,
W. W. HEALEY.